Figure 1:
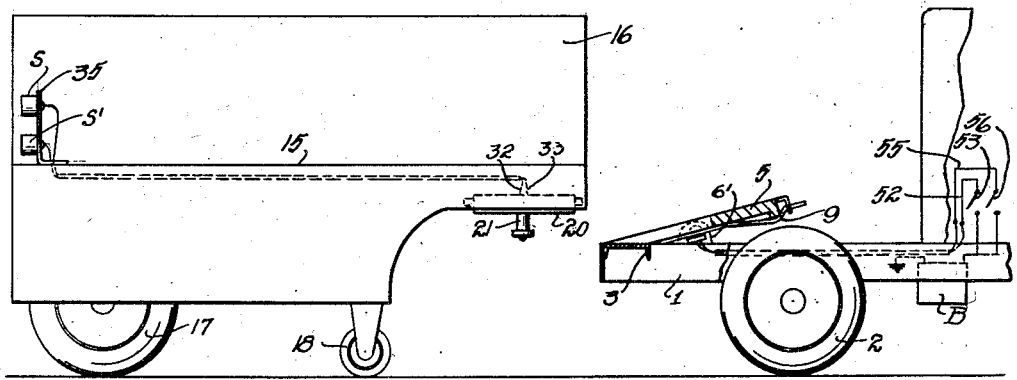

May 19, 1931.  H. B. STRACHAN  1,805,642

TRACTOR AND TRAILER COUPLING

Filed Oct. 14, 1929    2 Sheets-Sheet 1

Inventor
Hugh B. Strachan
By Bates, Orlick & Lane
Attorneys

May 19, 1931.  H. B. STRACHAN  1,805,642
TRACTOR AND TRAILER COUPLING
Filed Oct. 14, 1929    2 Sheets-Sheet 2
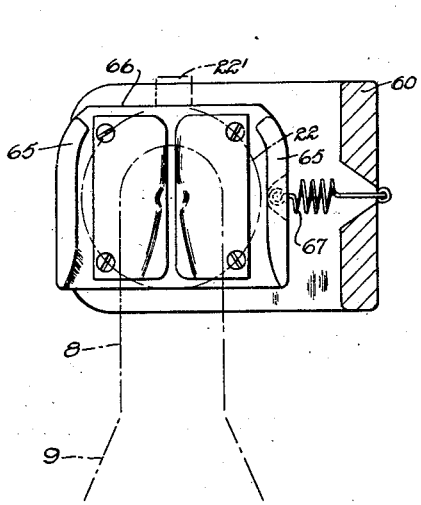
FIG_5
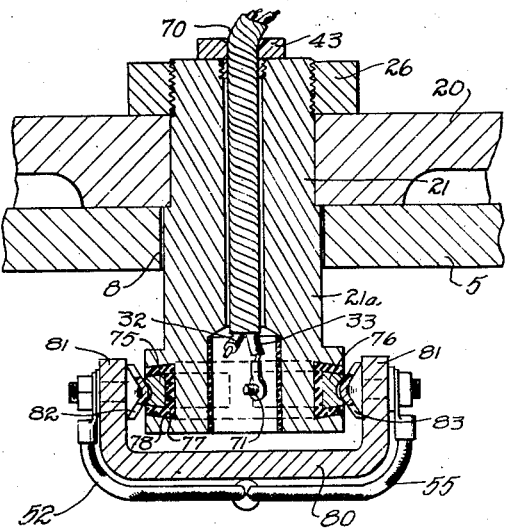
FIG_6
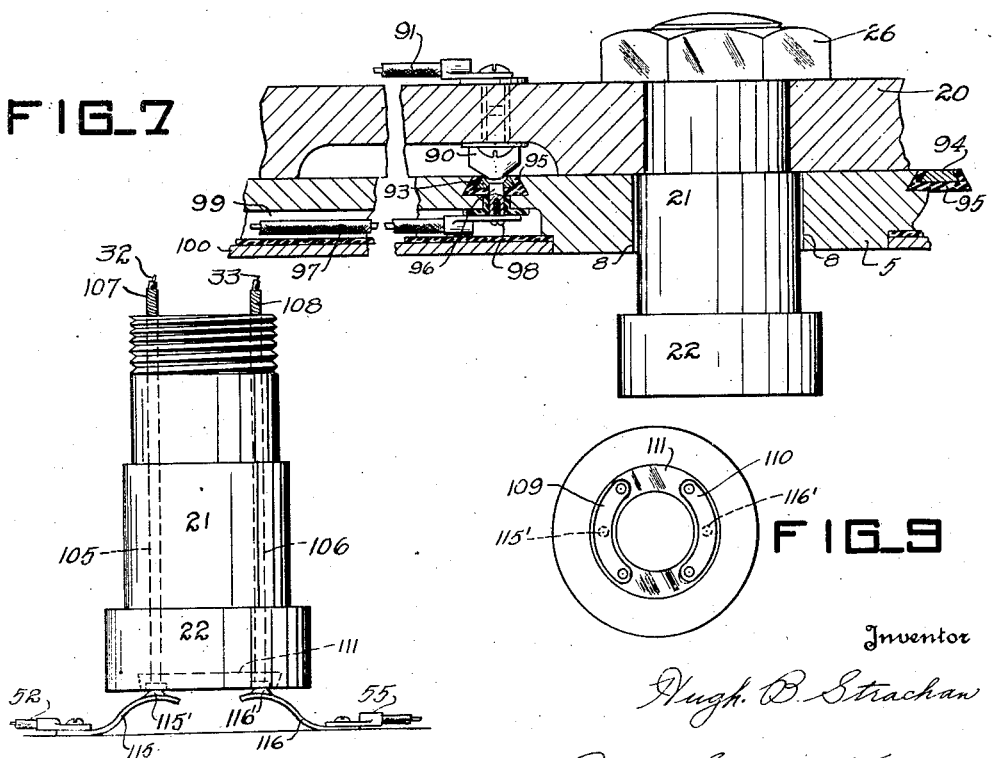
FIG_7
FIG_8
FIG_9
Inventor
Hugh B. Strachan
By Bates, Goldick & Teare
Attorneys Patented May 19, 1931

1,805,642

UNITED STATES PATENT OFFICE

HUGH B. STRACHAN, OF BEDFORD, OHIO, ASSIGNOR OF ONE-THIRD TO WALTER S. ROSS, OF BEDFORD, OHIO

TRACTOR AND TRAILER COUPLING

Application filed October 14, 1929. Serial No. 399,529.

This invention is concerned with a simple and efficient means for supplying current to operate signals or other electrically operable devices, electric brakes being a suitable example, on the trailer portion of a tractor-and-trailer load handling mechanism. Signals such as the tail light and caution light on such vehicles should obviously be as near the rear end of the trailer as possible, in fact, this is usually a code requirement. Obviously, such signals have to be controlled from the tractor and this necessitates electric connections of some sort between the tractor and the trailer. Ordinarily, a flexible conductor cable is provided, leading from the power supply and operating switches on the tractor to the signal circuits on the trailer, and the cable has a plug connection by which the operator may establish the circuits at the time the tractor and trailer are secured to each other and disconnect the circuits when the tractor and trailer are uncoupled.

It is practically essential that the trailer be allowed to swing about a substantially vertical axis through a considerable angle, and partly because of this a great deal of difficulty has been experienced with the use of cables and plug connections. For example, if the plug connection is made so that the connecting parts may be easily separated, then the disconnection may occur at any time as by reason of the cable looping over the tractor and trailer parts and becoming taut in turning, resulting in such disconnection. If, on the other hand, the plug connection is such that it will not readily disengage, then, at the time of disconnecting the trailer from the tractor, if the plug is not removed by the operator from its socket, the cable is likely to be pulled in two or the plug disabled for further use.

The primary object of my invention therefore, is to provide an improved, simple and effective device for supplying and controlling service current from a hauling tractor or the like to a device such as a signal light or lights on a trailer.

A specific object is to provide an efficient electric coupling for one or more circuits which will enable the necessary electrical connections to be associated with or pass close to the pivot center about which the trailer swings, thus doing away with the usual flexible cable and plug connections.

A further object is to provide an electrical connection in association with the pivotal connection between a tractor and trailer, which electrical connection will not be likely to get out of order and which will automatically operate to disconnect an electric line leading from the power supply and control on the tractor to the signal light or lights on the trailer, whenever the tractor and trailer are disconnected and to reestablish this electric connection when the tractor and trailer are again connected.

Further objects and features of the invention will become apparent from the following description relating to the accompanying drawings. The essential characteristics will be summarized in the claims.

Figure 2:
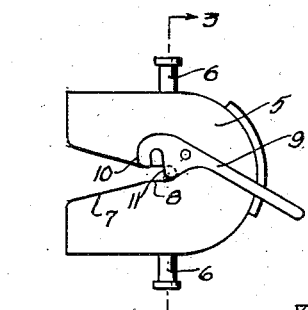
Figure 3:
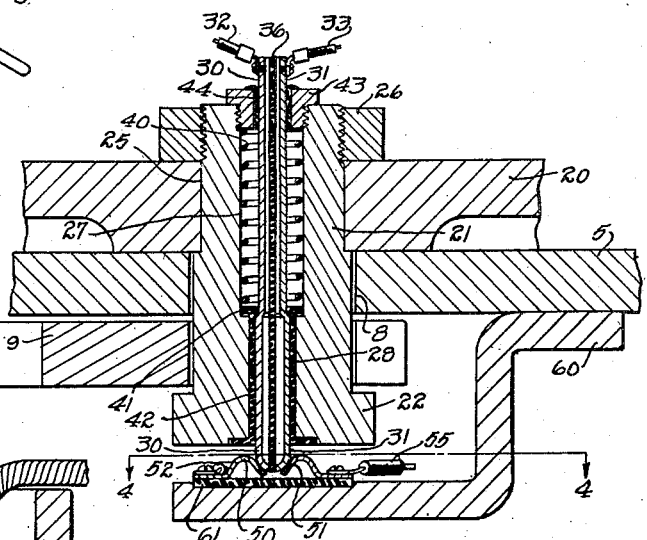
Figure 4:
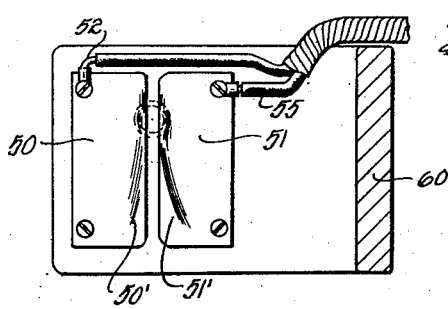

In the drawings, Fig. 1 is a side elevation of a tractor and trailer in disconnected position and showing the coupling parts, illustration of the forward end of the tractor being omitted; Fig. 2 is a plan view of certain of the parts of the mechanical coupling between the tractor and trailer; Fig. 3 is a detail sectional view of the coupling parts, as indicated by line 3—3 on Fig. 2, and showing one form of the electrical connections; Fig. 4 is a detail sectional plan view taken along the line 4—4 on Fig. 3; Fig. 5 is a plan view similar to Fig. 4 showing a modification of the invention; Fig. 6 is a sectional view of still another modified form, the view being taken similarly to Fig. 3; Fig. 7 is a fragmentary sectional view of still another modification of the invention taken on a vertical plane passing through the pivot center; Fig.

8 is a side elevation of a coupling king pin and modified arrangement of electric contact members associated therewith, and Fig. 9 is a bottom plan view of the king pin shown in Fig. 8 with the contact members thereof.

Referring in detail to the drawings, and first to Figs. 1 and 2, the main frame of a truck is indicated at 1. By the term "tractor" I intend to include any motor driven traction vehicle capable of hauling or adapted to haul a trailer. The tractor, as illustrated, has the usual driving wheels at 2 and, of course, steering wheels, motor and drive gearing (not shown). Near the rear end of the frame are suitable cross bracing members, one of which is shown at 3. A suitable pivot rest plate, indicated at 5, is shown as slung on trunnion bearings, the pintles therefor being indicated at 6. The trunnion axis extends transversely of the tractor. The pintles are carried by heavy brackets 6' rising from the frame 1 and may be greatly varied in construction. The trunnion arrangement is partly to allow the pivot rest plate to incline downwardly and rearwardly when the trailer is removed from the tractor so as to form a short ramp on which the cooperating pivot plate of the trailer (to be presently described) may ride into place. Suitable springs (not shown) are usually provided to maintain such inclination. The plate 5 has a rearwardly facing slot 7 which diverges toward the rear of the tractor to provide greater entrance clearance for the king pin on the trailer, to be presently described. At its forward end the slot is restricted, as at 8, to hold the pin against lateral displacement. 9 in Figs. 1 and 2 indicates a locking arm, a hook portion 10 of which swings to the rear of the king pin when the latter seats in the slot.

The trailer may be of any suitable construction. As shown, this has a main frame 15, usually built up of structural members and supporting a load carrier 16 on its top side. Below the frame is the usual supporting arrangement (not shown) for a pair of main load carrying wheels, one of which is shown at 17. The trailer usually has a set of temporary rest wheels 18 which, when the trailer is removed from the tractor support the weight of the forward end of the trailer. The supporting frame for the wheels 18 is usually pivotally mounted so that when the trailer is properly mounted on the tractor, the wheels 18 may be swung up under the trailer chassis sufficient to clear the road.

On the underside of the frame 15 of the trailer unit there is a bearing plate 20 of suitable rugged construction which is formed to ride on the plate 5 when the tractor and trailer are coupled and to transmit substantially all the vertical load of the forward end of the trailer to the hauling tractor. Extending downwardly from the plate 20 and preferably rigid therewith is a king pin 21 having an enlarged head 22 at its lower end. This king pin has its smaller diameter (above the head) such as to loosely fit the slot 8 in the rest plate 5, with the enlargement 22 underhanging the plate 5 adjacent the slot and preventing straight upward movement of the plate 20 off the plate 5. When the two units are coupled, as by backing the truck under the front end of the trailer so as to cause the plate 20 to ride up on the rest plate 5 and the king pin to enter the slot 8, the king pin abuts an arm 11 of the locking lever 9, causing the hooked portion 10 of the lever to swing behind the pin closely adjacent the smaller diameter of the pin and above the enlargement. Suitable means, not shown, are of course provided to maintain the lever 9 in locking position.

The above described arrangement securely fastens the tractor to the trailer, but allows it to swing freely relative thereto horizontally, as in making turns in the road, etc. I propose to associate the detachable connection, from the electric power and control to signal, with the above described or equivalent pivot parts, as close to the pivot axis as practicable, since the relative arcuate travel of the parts when the trailer swings with relation to the longitudinal tractor axis is least at the pivot axis.

Fig. 3 shows in detail, one arrangement of the detachable connection as well as a suitable trailer pivot construction. In this figure, it will be seen that the king pin is rigidly secured to the bearing plate 20 at a central opening 25 therein, the pin being shouldered to engage the plate 20 from below, that is, having a smaller diameter at the opening than between the opening and the head 22. The upper end of the pin is threaded to receive a nut 26 and this may be suitably locked in place in any convenient manner. The pin, as shown, is centrally bored on two diameters 27 and 28. Entering the bore are two segmental conductor bars 30 and 31. There may, as a matter of fact, be more than two of these, depending on the number of signals it is desired to employ on the trailer. The conductor bars 30 and 31 have respective connections, conductor wires 32 and 33 for example, leading to respective signals S and S' mounted on a suitable bracket, such as 35, at the rear of the trailer.

In detailed construction, the bars may comprise a sub-assembly, including an insulating strip 36, between the bars, and the assembly is designed for vertical sliding movement within the central bore of the king pin. This vertical sliding movement is desirable partly in order to maintain contact with cooperating conductor members, to be presently described, and further, in order that the conductor bars will yield and not be damaged in case, for example, the unprotected projecting ends of the bars, below the pin, should, in coupling the tractor and trailer together, be brought into contact with the plate 5 out of registration with the slot. This would probably cause the ends of the conductors to be damaged or broken off if the bars were immovable. To maintain the conductor bar assembly normally pressed downwardly, I have shown a coil spring 40 within the larger portion of the bore of the pin, which spring at its lower end bears against a ring of insulating material 41 seated against a shoulder 42 on the conductor bar assembly. At its upper end the spring reacts against an annular threaded closure member 43 in which the conductor bar assembly slides, the latter being insulated from the closure member by suitable insulating material, indicated at 44.

The cooperating contact members for the conductor bars 30 and 31 comprise suitably formed spring metal strips 50 and 51. These strips have suitable electric connections to control switches and a source of current. For example, a conductor wire 52, as shown, leads from the strip 50 through a switch 53 to the terminal of a battery B mounted in the usual manner on the tractor frame, and there is a similar wire 55 leading through a switch 56 to the battery, for the strip 51. The battery may be grounded through the frame, and likewise the signals may be grounded, although this is not essential, as separate return circuits through a conductor arrangement, such as above described, may be provided instead.

It will be understood that the signal which comprises the usual stop or caution signal may have its circuit switch associated with the brake or clutch pedal of the tractor control. The other signal illustrated is the usual tail light and naturally the corresponding switch would be located at the instrument board.

It is practically essential that the contact strips, such as 50 and 51, be supported in fixed relation to the plate 5 so as to maintain a definite cooperative relationship between the strips and the conductor bars 30 and 31 when the tractor and trailer are coupled. Accordingly, I have shown the strips 50 and 51 supported on a bracket 60 which is secured to the underside of the plate 5, as by screws for example. The strips 50 and 51 are, of course, insulated from the bracket as by an insulation strip 61.

Referring to Fig. 4, it will be seen that the strip contacts have portions 50' and 51' respectively which lie close to the insulation strip 61 so as to minimize accidental damage to the strips and to provide a gradual rise on which the bars 30 and 31 ride gradually into full contact. Beyond these portions 50' and 51', the strips rise in bowed formation, as will be apparent from inspection of both Figs. 3 and 4. These should be enough spring in the strips to maintain the electrical contact with the conductor bars 30 and 31, irrespective of some looseness or play between the tractor and trailer pivot parts.

If desired, the construction of the contact parts on the plate 5 may be such that the contact between the cooperating conductor members will not be broken, irrespective of the extent of horizontal swinging of the trailer. Such an arrangement is shown in Fig. 5. Here the head 22 of the king pin (shown in broken lines) has a lug 22' arranged to engage upstanding members 65 on a swingable block 66, the block directly supporting the strips 50 and 51. The block may be held in normal position on the supporting bracket 60 by a tension spring 67 connecting between the supporting bracket and the block. With this arrangement when the king pin turns in either direction to such an extent that the bar 30, for example, might otherwise touch the strip 51, the lug 22' turns the strip supporting block and thus maintains contact between the bars and their respective contact strips.

An obvious equivalent arrangement for the device of Fig. 4 would be to provide a support for the king pin in the bearing plate 20 which would allow the king pin with its contacts to turn, rather than the member which the king pin contacts engage. Such arrangement would simply be substantially the reverse of that shown in Fig. 5 and is therefore not illustrated.

In the modification shown in Fig. 6, I have shown an arrangement whereby the contacts on the king pin are at the sides thereof rather than at the end of the king pin. This construction also lends itself to existing conditions, that is, may be used without changing the mechanical coupling arrangement. The king pin is modified in that the electric conductors 32 and 33 run down through the king pin 21a through a suitable armoured cable 70 and are connected as by means of threaded studs, one of which is shown at 71, with segmental arcuate contact members 75 and 76 corresponding in function to the previously described bars 30 and 31. The contact members 75 and 76 may be supported and insulated by a ring of insulation material 77 set into a peripheral channel 78 in the enlarged head of the king pin. The members 75 and 76 are preferably set flush with the peripheral surface of the king pin head. 80 indicates a portion of a bracket which may be supported similarly to the previously described bracket 60 on the underside of the rest plate 5. The bracket has upstanding arms or side portions 81 supporting metallic spring contact strips 82 and 83. The contact strips incline toward the head from their anchorage on the bracket arms 81 and the head preferably enters between the strips from the anchored ends of the strips so as to minimize damage to the strips, in making the mechanical and electrical connections in coupling the trailer to the tractor. The conductors 52 and 55 have the usual electrical connections to the contact strips 82 and 83 respectively. As shown, the contact strips are convex in cross section and the members 75 and 76 may be peripherally grooved to present an annular concavity corresponding generally to the cross sectional shape of the strips.

Where there is sufficient vertical clearance there may be two rings 77, arranged one above the other, each containing one or more contact members. This would simply necessitate lengthening the head of the king pin and illustration is not therefore deemed necessary. Such an arrangement would be advantageous where the trailer is allowed to swing through half a circumference or more, since where there are two circuits the electric connections would not have to be broken in swinging the trailer through any angle.

In the arrangement of Fig. 7, the contact members are associated with the rest plate and bearing plate, exclusive of the king pin. This arrangement does not lend itself to existing conditions as well as the previously described arrangements, but could be used in many cases. As shown, there is a spring contact 90 for a conductor wire 91 for supplying current to a trailer signal. This spring contact may be supported on the underside of the bearing plate 20 which is usually recessed on its underside sufficiently to provide the necessary vertical clearance. The spring contacts may be rounded at their free ends sufficient to insure that they will ride up over the bearing plate into place on the corresponding contact strips of the rest plate without damage to the spring contacts.

The contact arrangement with relation to the rest plate may comprise arcuate metallic strip members 93 and 94, set either flush with or below the top surface of the rest plate and embedded in a ring of insulation material of suitable character, designated 95. Each of the members 93 and 94 have suitable connections to conductors leading away from the rest plate to the source of current and switch control. Only one connection is illustrated. As shown, there is a metallic member 96 in the nature of a rivet passing downwardly through the plate 5 through suitable insulating material, and the conductor wire 97 has the usual terminal connection with this member 96 as by a screw 98 threaded into the member 96 from below.

The conductor 97 may be protected by reason of lying in a recess 99 on the underside of the plate 5, which recess may be suitably covered by a plate 100 secured to the underside of the plate as by screws (not shown) so as to prevent damage to the conductor 97 by the locking lever or other parts below the rest plate. While only one contact 90 and corresponding contact 93 is illustrated, obviously the same arrangement would be used for other circuits, the number depending on the number of signal lights on the trailer.

In the modifications shown in Figs. 8 and 9, the king pin has two separate longitudinal bores 105 and 106 for armored cables 107 and 108 to contain the conductors such as 32 and 33. These conductors lead down through the cables to arcuate contact plates 109 and 110 suitably supported and insulated from the king pin as by an inset insulation ring 111. The spring contacts 115 and 116 for connection to conductors such as 52 and 55 preferably make substantially single point contact with the plates 109 and 110 as by rounded embossings 115' and 116'. The size relationship between the embossings and the arcuate plates is illustrated in Fig. 9. The adjacent ends of the arcuate strips 109 and 110 are separated a sufficient distance so that it is impossible for either of the contacts 115 or 116 to electrically bridge across the two arcuate plates and thereby short circuit the service line. Thus when the trailer pivots through an angle greater than 180° no damage can be done to the electric system, since the worst that can happen will be for the signal light service line to feed the tail light and vice versa.

I claim:

1. The combination of a motor driven road tractor, a trailer adapted to be hauled by the tractor, mechanical coupling members respectively associated with the tractor and trailer adapted to lock the tractor and trailer together while permitting relative horizontal pivotal movement betweeen the tractor and trailer when the coupling members are mutually associated, and electrical coupling members including relatively yielding cooperating sliding contacts carried respectively at all times by the mechanical coupling members, one of said contacts being arcuately extended about the pivot axis with relation to its cooperating contact through an angle corresponding substantially to the maximum horizontal swing of the trailer, whereby electrical communication between the tractor and trailer will be maintained throughout the cooperation thereof.

2. The combination of a motor driven road tractor, a coupling member carried thereby having a slot extending longitudinally of the tractor, a coupling member on the trailer including a king pin adapted to be received by said slot when the tractor and trailer are brought together, a latch for the king pin on the slotted member, and a plurality of electric contact members for establishing electric communication between the tractor and trailer when the coupling members are in operative position and for disestablishing such communication when the said coupling members are disassociated, one of said elements being carried by the king pin and another by the slotted member, each in substantially fixed position on the king pin and slotted member respectively, whereby movement of the king pin out of the slot will disestablish such electric communication.

In testimony whereof, I hereunto affix my signature.

HUGH B. STRACHAN.